United States Patent
Mutai et al.

(10) Patent No.: US 6,781,797 B2
(45) Date of Patent: Aug. 24, 2004

(54) LUBRICATED THREAD SCREW DRIVE AND METHOD OF MANUFACTURING SAME

(75) Inventors: Hitoshi Mutai, Nagano (JP); Yoshiaki Koshida, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 96 days.

(21) Appl. No.: 10/121,984

(22) Filed: Apr. 12, 2002

(65) Prior Publication Data
US 2003/0011927 A1 Jan. 16, 2003

(30) Foreign Application Priority Data

Apr. 13, 2001 (JP) ........................................ 2001-114954

(51) Int. Cl.$^7$ ............................ G11B 5/55; F16H 57/04
(52) U.S. Cl. ...................................... 360/267.3; 74/467
(58) Field of Search .......................... 360/267.3, 267.4, 360/267.7, 267.8; 74/467

(56) References Cited

U.S. PATENT DOCUMENTS 3,651,706 A * 3/1972 Galbarini et al. ............. 74/410
4,276,003 A * 6/1981 Perkins et al. ............... 417/415

FOREIGN PATENT DOCUMENTS

| JP | 6-201015 | * | 7/1994 |
| JP | 08088952 | * | 4/1996 |
| JP | 11063386 | * | 3/1999 |
| JP | 11-230297 | | 8/1999 |
| JP | 2000-51985 | | 2/2000 |

* cited by examiner

*Primary Examiner*—A. J. Heinz
(74) *Attorney, Agent, or Firm*—Reed Smith LLP

(57) ABSTRACT

A motor is disclosed comprising a motor case and a rotating shaft for the motor having a portion within the motor case and a portion extending outside of the motor case. A feed screw is formed on the extending portion of the rotating shaft. The feed screw threadedly engages with a moving body which moves back and forth along an axial direction of the rotating shaft. The feed screw has a threaded portion, a top portion of this threaded portion being provided with a concavity to store lubricating oil.

4 Claims, 3 Drawing Sheets

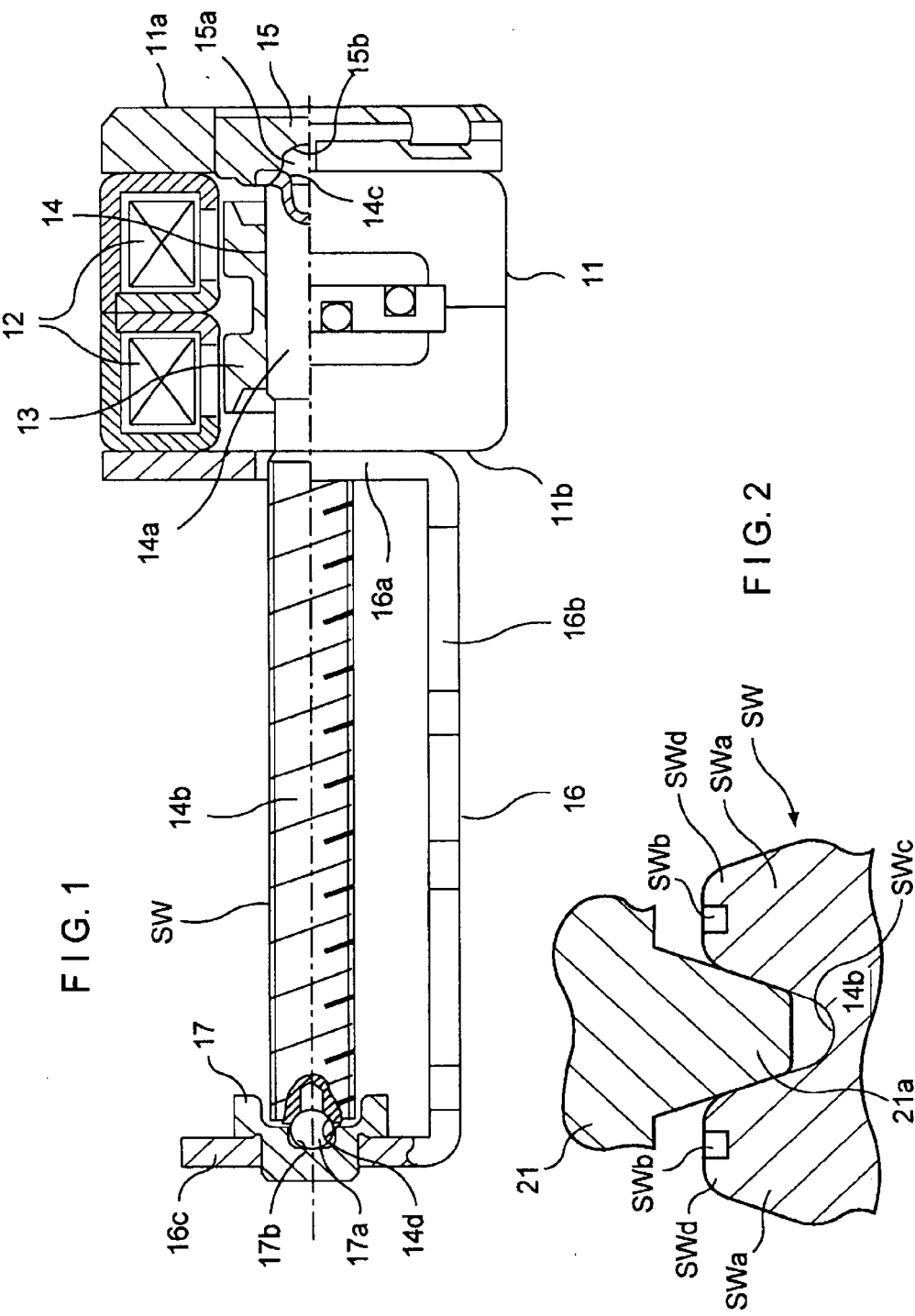

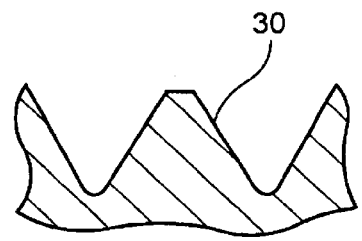
F I G. 3

LUBRICATED THREAD SCREW DRIVE AND METHOD OF MANUFACTURING SAME

CROSS-REFERENCE TO RELATED APPLICATION

This application claims priority of Japanese Application No. 2001-114954, filed Apr. 13, 2001, the complete disclosure of which is hereby incorporated by reference.

BACKGROUND OF THE INVENTION a) Field of the Invention

The present invention relates to a motor to which a feed screw is formed in a rotation shaft extending out of a motor case and a method of manufacturing the same.

b) Description of the Related Art

Generally, in types of devices such as a head mechanism used for a floppy disk driving device (FDD) or a driving device (ODD) for an optical recording reproduction disc such as CD, DVD or an optical lens driving device of a camera and the like, structure that forms a feed screw (a lead screw) as a rotating shaft of a motor has been broadly adopted.

Such a motor shown in FIG. 4, for example, shows a rotating shaft 2 which is provided so as to extend from the inside of motor case 1 to the outside of the case.

A feed screw (a lead screw) 3 is manufactured (worked) and formed by a ball-race process or by forming in a rolling process in a portion extending out of the motor case of rotating shaft 2.

A moving body is engaged threadedly in feed screw 3. The moving body such as the head or the optical lens described above moves back and forth on feed screw 3.

Furthermore, in general, the rotating shaft 2 is supported rotatably by appropriate bearing member 4 at a boundary portion which is arranged between an internal portion of the motor case and a portion extending out of the motor case.

On the other hand, when feed screw (a lead screw) 3 is formed by forming of a rolling process on a blank of rotating shaft 2, the blank is pressurized by an appropriate rolling tool.

That is, shown in FIG. 5, for example, a wall is built up from both side portions of the part on which screw thread 3a is formed so that the wall comes to screw thread 3a.

A groove-shaped screw trough 3b is formed in both side portions of screw thread 3a, too.

In the time immediately after the above forming of the rolling process, shown with oblique line in FIG. 5, groove-shaped concavity 3d is formed in the center portion of building up portion 3c of screw thread 3a.

Further, conventionally, building up portion 3c, including the concavity 3d, is removed by center-less polish.

In addition, after having carried out such center-less polish, a working burr occurs on screw thread 3a.

After working, deburring is carried out by a process such as a barrel treatment or a buff treatment.

However, as described above, in the motor having feed screw 3 formed in the rotating shaft, it is difficult to maintain lubricity of feed screw 3 and it is a problem that an external scattering of lubricant occurs.

Furthermore, as mentioned above, center-less polish and deburring process after forming of the rolling process comparatively took time.

Accordingly, each process described above is one of the causes of productivity degradation.

In addition, when carrying out these processes, respectively, there is a possibility of a streak and a nick (gouge) occurring in a screw portion so that there is a concern and fear that quality may be decreased.

OBJECT AND SUMMARY OF THE INVENTION

Thus, a primary aim of the present invention is to improve lubricity of a feed screw by a simple structure and also to offer a motor which can improve both the productivity and quality of a feed screw and to a method of manufacturing the same.

According to the invention, a motor comprises a motor case and a rotating shaft for the motor having a portion within the motor case and a portion extending outside of the motor case. A feed screw is formed on the extending portion of the rotating shaft. The feed screw threadedly engages with a moving body which moves back and forth along an axial direction of the rotating shaft. It is also provided with a concavity to store lubricating oil at the top of a screw thread of the feed screw so that lubricating oil can be stored in the concavity.

Thus, lubricity is well maintained over a long time and lubricating oil which scatters by centrifugal force outside is held with the concavity. As a result, external scattering is well prevented.

Further, according to the invention, it is provided that bearing materials are arranged at opposite end portions between a bottom portion of an end side of an internal portion of the motor case of the rotating shaft and a top portion of the portion extending out of the motor case. The bearing materials support the rotating shaft. Further, sphere members are arranged to protrude from the end portions of the rotating shaft in an axial direction. The sphere members are rotatably supported on the bearing materials.

Thus, a bearing material is not attached at a boundary portion of the rotating shaft which is arranged between the internal portion of the motor case and the portion extending out of the motor case.

The feed screw is formed on the boundary portion of the rotating shaft without waste so that an active length of the feed screw is expanded.

Furthermore, it is possible to shorten the overall length of the rotating shaft in an axial direction, and the boundary portion of the rotating shaft does not need a bearing surface to which the bearing material is attached for polishing of the bearing surface. That is, a center-less polishing process and a deburring process after forming of the rolling process and the like is not needed. As a result, productivity and quality are improved.

Furthermore, according to the invention, a method is provided for forming a feed screw on a portion extending out of the motor case of a rotating shaft which is provided so as to extend from inside of the motor case to outside of the case by forming of the rolling process; the feed screw having a top of a screw thread and the screw thread top having a concavity to store lubricating oil.

Accordingly, lubricity of the feed screw is well maintained over a long time and after forming of the rolling process of the top of the screw thread, center-less polish of the top of the screw thread is not carried out so that deburring process after center-less polish is not needed. Thus, productivity and quality are improved simultaneously.

Furthermore, according to the invention, a method is provided where the bearing materials, respectively, which support the rotating shaft, are arranged at opposite end portions between a bottom portion of an end side of an internal portion of the motor case of the rotating shaft and the top portion of the portion extending out of the motor case; and sphere members, respectively, are provided which are arranged to protrude from the end portions of the rotating shaft in an axial direction. The sphere members are supported rotatably by the bearing materials.

Accordingly, the motor is manufactured such that a bearing material is not attached at a boundary portion of the rotating shaft which is arranged between the internal portion of the motor case and the extending portion out of the motor case.

There is a possibility of using the boundary portion of the rotating shaft as an area of shifted wrinkles which occur by forming of the rolling process so that a feed screw is formed without waste and an active length of the feed screw is expanded. It is possible to shorten an overall length in an axial direction of the rotating shaft.

The boundary portion of the rotating shaft does not need a bearing surface to which a bearing material is attached for polishing of the bearing surface. That is, the center-less polishing process and the deburring process after forming of the rolling process and the like is not needed. As a result, productivity and quality are improved.

Preferred embodiments of the present invention will hereinafter be described in detail with reference to the attached drawings.

BRIEF DESCRIPTION OF DRAWINGS

In the drawings:

FIG. 1 shows a half section side elevation of one embodiment of a motor relating to the present invention;

FIG. 2 shows an explanatory drawing magnified in cross-section of the feed screw shown in FIG. 1;

FIG. 3 is a magnified cross-sectional explanatory drawing of the feed screw of another embodiment;

DESCRIPTION OF THE PREFERRED EMBODIMENTS

Figure 2A:
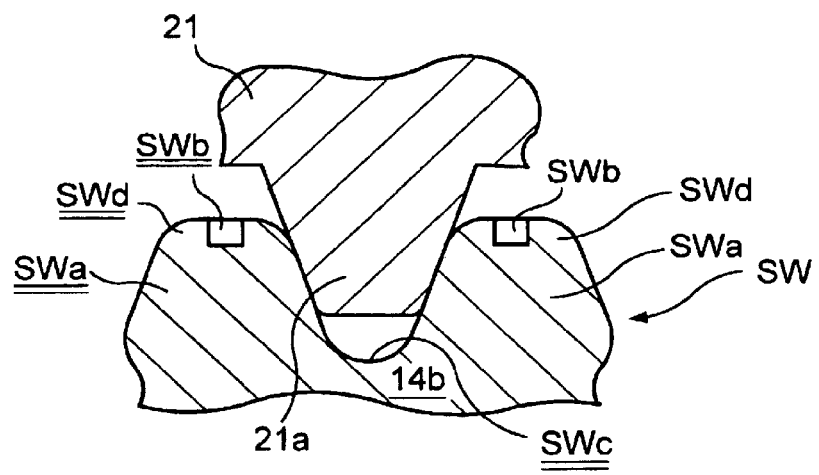
FIG. 2A is identical to FIG. 2 except that it indicates the location of the magnified section own in FIG. 2B.

At first, the motor which is shown in FIG. 1 applies to a head mechanism used for an optical recording reproduction disc such as a CD, DVD, or an optical lens driving device of a camera.

Stator coil 12 is arranged circumferentially along an internal circumference wall surface of motor case 11 in the inside of approximately hollow cylinder-shaped motor case 11.

Rotor magnet 13, comprising a permanent magnet, is arranged so as to rotate with a rotating shaft 14 integratedly in an inside space of stator coil 12.

The rotating shaft 14 is provided with an internal portion (of the motor case) 14a which is in the inside of motor case 11 and an extending portion (out of the motor case) 14b which extends toward the outside of motor case 11 integratedly in the axial direction.

A bottom portion of the illustrated right end side of an internal portion (of the motor case) 14a of rotating shaft 14 is supported in a pivotal fashion (for rotatability) by resin bearing 15.

The resin bearing 15 is provided at rear end side closed wall 11a of motor case 11.

That is, in a hemisphere face-shaped concavity 14c, the right-side end side portion is provided in an axial direction of rotating shaft 14; sphere member 15a, which is different from rotating shaft 14, is arranged rotatably in contact with hemisphere face-shaped concavity 14c.

The sphere member 15a is arranged to protrude from rotating shaft 14 in an axial direction and an outside side protrusion portion of sphere member 15a is supported rotatably and contacts with hemisphere face-shaped concavity 15b which is formed on resin bearing 15.

Furthermore, an illustrated right end side portion of rotating shaft 14 is supported rotatably in both a radial direction and a thrust direction against resin bearing 15 through such sphere member 15a.

On the other hand, a support arm 16 extending approximately parallel with rotating shaft 14 is attached to the extending portion (out of the motor case) 14b of rotating shaft 14.

A mounting base plate 16a of support arm 16 is adhered to the front side closed wall 11b of motor case 11.

An arm main frame portion 16b bends approximately at a right angle from the mounting base plate 16a and extends approximately parallel with rotating shaft 14 and a support plate 16c is provided in the tip portion of the arm main frame portion 16b.

The support plate 16c bends approximately at a right angle from arm main frame portion 16b again and extends.

A resin bearing 17 is fitted into support plate 16c of support arm 16 and an illustrated left edge side portion in an axial direction of the extending portion (out of the motor case) 14b of rotating shaft 14 is supported in pivotal (rotatability) by resin bearing 17.

That is, a hemisphere face-shaped concavity 14d is provided at the illustrated left end side portion in an axial direction of rotating shaft 14 and sphere member 17a, which is different from rotating shaft 14, is arranged rotatably in contact with hemisphere face-shaped concavity 14d.

The sphere member 17a is arranged to protrude from rotating shaft 14 in an axial direction and an outside side protrusion portion of sphere member 17a is supported rotatably and contacts with hemisphere face-shaped concavity 17b which is formed on resin bearing 17.

In addition, through such sphere member 17a, an illustrated left end side portion of rotating shaft 14 is supported rotatably in both a radial direction and a thrust direction against resin bearing 17.

Both end portions of rotating shaft 14 in an axial direction are supported through sphere members 15a, 17a which are supported in a different manner from rotating shaft 14.

Figure 4:
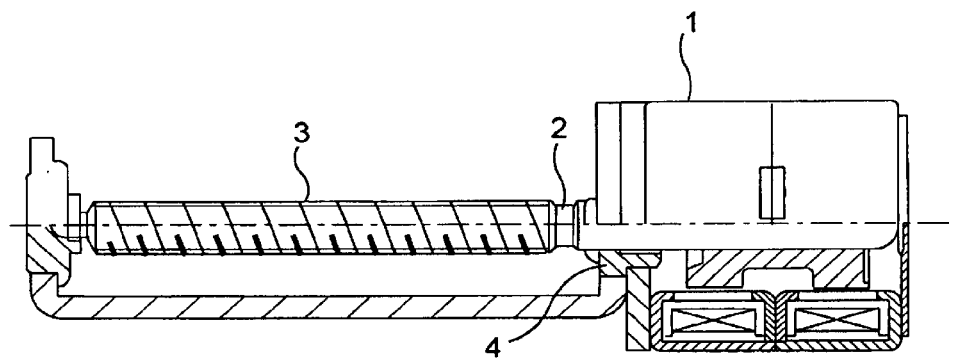
FIG. 4 shows a half section side elevation of a conventional motor.
Figure 5:
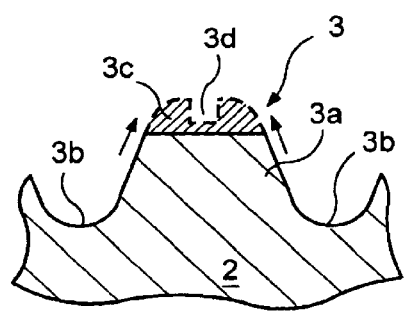
FIG. 5 shows a magnified cross-sectional explanatory drawing of the conventional feed screw shown in FIG. 4.

Note that conventional bearing materials (cf. mark 4 in FIG. 4) as above described are not attached to the motor of this embodiment, which is arranged at a boundary portion between the internal portion of motor case 14a and the portion extending out of motor case 14b.

In addition, a feed screw (a lead screw) SW is formed over almost the overall length of the extending portions out of motor case 14b.

Figure 2B:
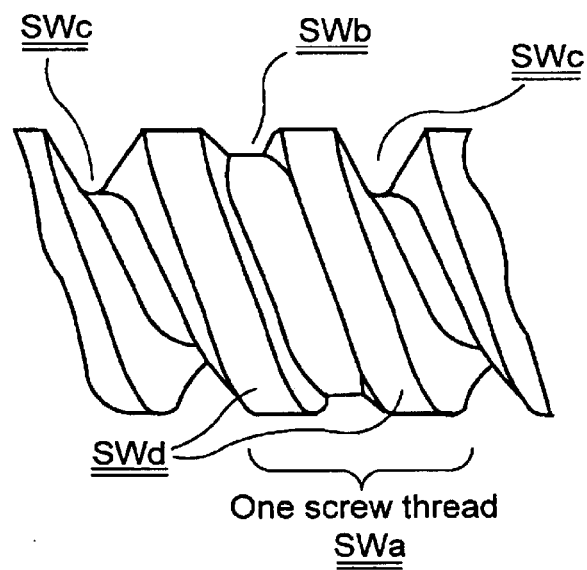
FIG. 2B is a magnified sectional view of the section indicated in FIG. 2A.

For example, shown in FIG. 2, screw portion 21a of carriage portion 21 holding a moving body is engaged threadedly on the feed screw SW.

The rotating shaft 14 is driven and the moving body mounting on carriage portion 21 moves back and forth along an axial direction for rotating speed (number of revolutions) corresponding to feed pitch of the feed screw SW.

Moreover, a groove-shaped concavity SWb to store lubricating oil is provided in the top portion of a screw thread SWa forming the feed screw SW.

The concavity SWb is formed simultaneously when forming the screw thread SWa by forming of the rolling process.

That is, when forming the feed screw SW by forming of the rolling process, a blank of the above described rotating shaft 14 is pressurized by an appropriate rolling tool.

A wall is built up from both side portions of the part on which a screw thread SWa is formed so that the wall comes to the screw thread SWa, simultaneously; a groove-shaped screw through SWc is formed on both side portions of the screw thread SWa.

The time immediately after such forming of the rolling process, the groove-shaped concavity SWb as described above is formed in the center portion of a building up portion SWd of the screw thread SWa.

Note that, after the worked forming of the rolling process, center-less polish as described above as the normal convention does not proceed so that the building up portion SWd of the screw thread SWa and the concavity SWb remains just as it is.

The concavity SWb functions as an oil reservoir (storage) and appropriate lubricating oil is stored in the inside of the concavity SWb. Lubricating oil is supplied with the feed screw SW.

In the process of forming of the rolling process of the feed screw SW, the size of the dice and blank diameter is set up such that the concavity SWb which functions as an oil reservoir (storage) can be formed with appropriate size.

Note that if the screw part 21a of the carriage part 21 did not touch (completely) at the top of the screw thread SWa as shown in FIG. 2, it was not necessary originally to remove the building up portion SWd so as to be able to put it after forming of the rolling process.

Thus, even if the building up portion SWd was not present, it has little effect on the function of the feed screw.

In a motor such as the embodiment as described above, the concavity SWb which stores lubricating oil is provided in the top of the screw thread SWa configuring the feed screw SW.

Lubricating oil is stored in the concavity SWb so that good lubricating ability is maintained over a long term and lubricating oil which scatters by centrifugal force outside is held with the concavity SWb. Thus, the external scattering is well prevented.

In addition, after the worked forming of the rolling process of the top of the screw thread SWa, this process does not require center-less polish as shown in the prior art.

Accordingly, deburring process after forming of the rolling process is not needed so that productivity and quality are improved.

Furthermore, in a motor of such embodiment, bearing materials 15,17, respectively, supporting rotating shaft 14 are arranged at opposite end portions on rotating shaft 14 between the end portion of the internal portion of motor case 14a and the top portion of the portion extending out motor case 14b.

Sphere members 15a, 17a, which are different from rotating shaft 14, are supported rotatably by bearing materials 15,17 from both the end portions of rotating shaft 14 outwardly in an axial direction.

Note that a bearing material is not attached at a boundary portion of rotating shaft 14 between the internal portion of motor case 14a and the extending portion out of motor case 14b.

Accordingly, the feed screw is formed on the boundary portion of rotating shaft 14 without waste so that an active length of the feed screw is expanded.

It is possible to shorten the overall length of rotating shaft 14 in an axial direction.

Furthermore, the boundary portion of rotating shaft 14 does not need a bearing surface to which a bearing material is attached.

Thus, polishing of the bearing surface, that is, a center-less polishing process and a deburring process after forming of the rolling process and the like is not needed. As a result, productivity and quality are improved.

In addition, in particular, assuming that there is a possibility of employing the boundary portion of rotating shaft 14 as an area of shifted wrinkles which occurs by forming of the rolling process, the feed screw SW is formed without waste in this manner as well.

While the foregoing description and drawings represent the present invention, it will be obvious to those skilled in the art that various changes may be made therein without departing from the true spirit and scope of the present invention.

For example, sphere members 15a, 17a which are supported on both end portions of rotating shaft 14 in an axial direction are different from rotating shaft 14 in the above described embodiment.

However, it is possible to provide sphere members integratedly with a rotating shaft.

Further, the specification for this invention discloses a motor used for recording a reproduction disc driving device of optics (ODD) such as in each embodiment described above. The invention is not limited to the above motor.

It can be applied to a motor used for other various devices like a feed screw 30 in a motor for a camera optical lens drive as shown in FIG. 3.

According to the invention, a concavity is provided for storing lubricating oil at the top of the screw thread of the feed screw, the lubricating oil being stored in the concavity so that lubricity is well maintained over a long time and the lubricating oil which scatters by centrifugal force outside is held within the concavity. Thus, the external scattering is well prevented.

It can be formed easily and be created largely as a function of a feed screw.

It is possible to improve both productivity and quality of the feed screw in accordance with the invention.

Further, the motor according to the invention is provided with bearing materials respectively arranged at opposite end portions between a bottom portion of an end side of an internal portion of the motor case of the rotating shaft and the top portion of the portion extending out of the motor case. The bearing materials support the rotating shaft; and sphere members, respectively, are arranged to protrude from the end portions of the rotating shaft in an axial direction. The sphere members are rotatably supported on the bearing materials.

Thus, a bearing material is not attached at a boundary portion of the rotating shaft between the internal portion of the motor case and the portion extending out of the motor case.

The feed screw is formed on the boundary portion of the rotating shaft without waste so that an active length of the feed screw is expanded.

It is possible to shorten the overall length in the axial direction of the rotating shaft and the boundary portion of the rotating shaft does not require a bearing surface to which a bearing material is attached for polishing of the bearing surface, That is, center-less polishing process and deburring process after forming of the rolling process and the like is not needed. As a result, productivity and quality are improved.

It is possible to improve productivity and quality of the feed screw.

While improving the effect, furthermore, downsizing of a motor can be planned.

Furthermore, according to the invention, a method of forming a feed screw on a portion extending out of a motor case of a rotating shaft which is provided so as to extend from the inside of the motor case to the outside by forming of the rolling process; a feed screw has a screw thread at the top and the top of the screw thread contains a concavity to reserve lubricating oil lubricity of the feed screw which is well maintained over a long time and after forming of the rolling process of the top of the screw thread, center-less polish of the top of the screw thread will not work so that a deburring process after center-less polish is not needed. Thus, productivity and quality are improved simultaneously.

It can be formed easily and be made largely a function of the feed screw. It is possible to improve both productivity and quality of the feed screw.

Furthermore, as to the motor, it is provided that a method of the bearing materials, respectively, which support the rotating shaft, are arranged at opposite end portions between a bottom portion of an end side of an internal portion of the motor case of the rotating shaft and the top portion of the portion extending out of the motor case; and sphere members, respectively, which are arranged to protrude from the end portions of the rotating shaft in an axial direction. The sphere members are supported rotatably by the bearing materials.

Accordingly, the motor is manufactured such that a bearing material is not attached at the boundary portion of the rotating shaft between the internal portion of the motor case and the portion extending out of the motor case.

There is the possibility of employing the boundary portion of a rotating shaft as an area of shifted wrinkles which occur by forming of a rolling process so that the feed screw is formed without waste and an active length of the feed screw is expanded. It is possible to shorten the overall length in the axial direction of the rotating shaft.

The boundary portion of the rotating shaft does not need a bearing surface to which a bearing material is attached for polishing of the bearing surface. That is, there is no need for a center-less polishing process and a deburring process after forming of a rolling process and the like. As a result, productivity and quality are improved.

It is possible to improve both productivity and quality of the feed screw.

While improving the result as described above, plans for downsizing of a motor can also be made.

What is claimed is:

1. A motor comprising:

a motor case;

a rotating shaft for said motor having a portion within said motor case and a portion extending outside of said motor case;

a feed screw being formed on said extending portion of said rotating shaft, said feed screw threadedly engaging with a moving body which moves back and forth along an axial direction of said rotating shaft; and said feed screw having a threaded portion, a top portion of said threaded portion being provided with a concavity to store lubricating oil;

said concavity being a circumferentially orientated groove forming a circumferential channel in said top portion, said groove encircling the circumference of said top portion.

2. The motor according to claim 1, wherein bearing materials respectively being arranged at opposite end portions of said rotating shaft between a bottom portion of an end side of said portion internal to said motor case and the top portion of said portion extending out of said motor case, said bearing materials for supporting said rotating shaft; and sphere members respectively being arranged to protrude from said opposite end portions of said rotating shaft in an axial direction, said sphere members being supported rotatably on said bearing materials.

3. A method for manufacturing a motor comprising the step of:

forming a feed screw on a portion of a rotating shaft extending out of a motor case, said rotating shaft being provided to extend from the inside of said motor case to the outside of said case, said forming being of a rolling process;

wherein said feed screw has a top of a screw thread with a top portion and said top portion of said screw thread having a concavity to store lubricating oil;

and wherein said concavity is formed as a circumferentially orientated groove forming a circumferential channel in said top portion, said groove encircling the circumference of said top portion.

4. The method for manufacturing a motor according to claim 3, wherein bearing materials are included which support said rotating shaft, and are arranged at opposite end portions between a bottom portion of an end side of said internal portion of the motor case of said rotating shaft and a top portion of said portion extending out of the motor case; and sphere members being arranged to protrude from said opposite end portions of said rotating shaft in an axial direction, said sphere members being supported rotatably on said bearing materials.

* * * * *